United States Patent
Hida et al.

(10) Patent No.: US 7,499,613 B2
(45) Date of Patent: Mar. 3, 2009

(54) Y BRANCH CIRCUIT AND METHOD FOR MANUFACTURING THE SAME

(75) Inventors: Yasuhiro Hida, Atsugi (JP); Toshimi Kominato, Atsugi (JP); Yasuyuki Inoue, Atsugi (JP); Norio Takato, Tokyo (JP); Yasumori Ohmura, Tokyo (JP)

(73) Assignee: NTT Electronics Corporation, Tokyo (JP)

( * ) Notice: Subject to any disclaimer, the term of this patent is extended or adjusted under 35 U.S.C. 154(b) by 0 days.

(21) Appl. No.: 11/447,229

(22) Filed: Jun. 5, 2006

(65) Prior Publication Data

US 2006/0278960 A1 Dec. 14, 2006

(30) Foreign Application Priority Data

Jun. 6, 2005 (JP) .............................. 2005-165723

(51) Int. Cl.
*G02B 6/42* (2006.01)
*G02B 6/02* (2006.01)

(52) U.S. Cl. .............................. 385/45; 385/15; 385/39; 385/43

(58) Field of Classification Search .................... 385/45, 385/15, 39, 43
See application file for complete search history.

(56) References Cited

U.S. PATENT DOCUMENTS

| 5,745,619 | A  | * | 4/1998  | Li et al. ......................... 385/48 |
| 6,463,188 | B1 | * | 10/2002 | Takahashi et al. .............. 385/14 |
| 2003/0156813 | A1 | * | 8/2003 | Terakawa et al. ............ 385/129 |
| 2005/0207705 | A1 | * | 9/2005 | Laurent-Lund .............. 385/45 |
| 2007/0053636 | A1 | * | 3/2007 | Takahashi et al. .............. 385/45 |

FOREIGN PATENT DOCUMENTS

| JP | 58-105111 |   | 6/1983 |            |
| JP | 04-070605 |   | 3/1992 |            |
| JP | 05-157925 |   | 6/1993 |            |
| JP | 08-220359 |   | 8/1996 |            |
| JP | 04-070605 | * | 3/2002 | ................... 385/14 |

* cited by examiner

*Primary Examiner*—Frank G Font
*Assistant Examiner*—Jerry Blevins
(74) *Attorney, Agent, or Firm*—Workman Nydegger

(57) ABSTRACT

A Y branch circuit according to the present invention includes; a under clad; a circuit core, formed on the under clad and having a main core and two branch cores, connected to the main core, and an over clad that embeds the circuit core. The main core and the two branch cores are connected across an interval. The two branch cores have a width-to-height ratio of 50% to 150% and have a gap, at the main core end, that is narrower at the over clad side than at the under clad side.

10 Claims, 16 Drawing Sheets

| Tsc(°C) | Tso(°C) | Tto(°C) | ΔTs(°C) | ΔTt(°C) | EVALUATION |
|---|---|---|---|---|---|
| 1050 | 650 | 950 | 400 | 300 | ● |
| 1050 | 750 | 1050 | 300 | 300 | ● |
| 1050 | 800 | 1100 | 250 | 300 | ○ |
| 1050 | 850 | 1150 | 200 | 300 | ○ |
| 1050 | 900 | 1200 | 150 | 300 | ○ |
| 1050 | 950 | 1250 | 100 | 300 | ○ |
| 1050 | 1000 | 1300 | 50 | 300 | × |

FIG.6

| Tsc(°C) | Tso(°C) | Tto(°C) | ΔTs(°C) | ΔTt(°C) | EVALUA-TION |
|---|---|---|---|---|---|
| 1050 | 650 | 1150 | 400 | 500 | × |
| 1050 | 750 | 1150 | 300 | 400 | ● |
| 1050 | 800 | 1150 | 250 | 350 | ○ |
| 1050 | 850 | 1150 | 200 | 300 | ○ |
| 1050 | 900 | 1150 | 150 | 250 | ○ |
| 1050 | 950 | 1150 | 100 | 200 | ○ |
| 1050 | 1000 | 1150 | 50 | 150 | ■ |

FIG.7

| Tsc(°C) | Tso(°C) | Tto(°C) | ΔTs(°C) | ΔTt(°C) | EVALUATION |
|---|---|---|---|---|---|
| 1050 | 750 | 1000 | 300 | 250 | ● |
| 1050 | 750 | 1100 | 300 | 350 | ● |
| 1050 | 750 | 1200 | 300 | 450 | ● |
| 1050 | 750 | 1300 | 300 | 550 | × |

FIG.8

| Tsc(°C) | Tso(°C) | Tto(°C) | ΔTs(°C) | ΔTt(°C) | EVALUATION |
|---|---|---|---|---|---|
| 1050 | 850 | 1000 | 200 | 150 | ■ |
| 1050 | 850 | 1100 | 200 | 250 | ○ |
| 1050 | 850 | 1200 | 200 | 350 | ○ |
| 1050 | 850 | 1300 | 200 | 450 | × |

FIG.9

| Tsc(°C) | Tso(°C) | Tto(°C) | ΔTs(°C) | ΔTt(°C) | EVALUATION |
|---|---|---|---|---|---|
| 1000 | 850 | 1000 | 150 | 150 | ■ |
| 1000 | 850 | 1100 | 150 | 250 | ○ |
| 1000 | 850 | 1200 | 150 | 350 | ○ |
| 1000 | 850 | 1300 | 150 | 450 | × |

FIG.10

| Tsc(°C) | Tso(°C) | Tto(°C) | ΔTs(°C) | ΔTt(°C) | EVALUATION |
|---|---|---|---|---|---|
| 1000 | 750 | 1000 | 250 | 250 | ● |
| 1000 | 750 | 1100 | 250 | 350 | ○ |
| 1000 | 750 | 1200 | 250 | 450 | ○ |
| 1000 | 750 | 1300 | 250 | 550 | × |

FIG.11

| Tsc(°C) | Tso(°C) | Tto(°C) | ΔTs(°C) | ΔTt(°C) | EVALUA-TION |
|---|---|---|---|---|---|
| 950 | 850 | 1000 | 100 | 150 | ■ |
| 950 | 850 | 1100 | 100 | 250 | O |
| 950 | 850 | 1200 | 100 | 350 | × |
| 950 | 850 | 1300 | 100 | 450 | × |

FIG.12

Y BRANCH CIRCUIT AND METHOD FOR MANUFACTURING THE SAME

This application claims priority from Japanese Patent Application No. 2005-165723 filed Jun. 6, 2005, which is hereby incorporated by reference herein.

BACKGROUND OF THE INVENTION

1. Field of the Invention

The present invention relates to an optical branching device that is important as a basic device of optical communication systems, and particularly relates to a waveguide type, low-loss Y branch circuit of excellent productivity and stability and a method for manufacturing the same.

2. Description of the Related Art

With a backdrop of demand for various network services, such as the internet, video distribution, etc., FTTH (Fiber To The Home), with which optical fibers are laid to each household, is spreading rapidly. Among several network arrangements for FTTH, a PON (Passive Optical Network) arrangement is economical in that expensive transmission devices, to be installed in bureaus, and optical fibers, extending from bureaus to vicinities of user's homes, are shared by a plurality of users. Optical branching devices that distribute optical signals of a single optical fiber among a plurality of optical fibers are key devices of PON arrangements, and among such devices, waveguide branch circuits, having Y branch circuits arranged in tandem in multiple stages, are widely used due to being excellent in productivity and stability.

FIGS. 14A to 14E show a basic arrangement of a Y branch circuit. FIG. 14A is a plan view and FIGS. 14B to 14E are sections taken on section lines XIVB-XIVB', XIVC-XIVC', XIVD-XIVD', and XIVE-XIVE', respectively, of FIG. 14A.

The Y branch circuit shown in FIGS. 14A to 14E includes: a under clad 10; a circuit core 16, formed on under clad 10 and arranged from a main core 13 and two branch cores 14 and 15 that are connected to main core 13; and an over clad 11 that embeds circuit core 16. Main core 13 is connected to branch cores 14 and 15 at connection part 21 across a gap 18. Branch cores 14 and 15 are mutually spaced apart by a gap 17 at connection part 21. Also, branch cores 14 and 15 gradually separate from each other with distance from connection part 21.

In FIG. 14A, section line XIVB-XIVB' indicates a position of an end face of main core 13 at the connection part 21 side, section line XIVC-XIVC' indicates a position of end faces of branch cores 14 and 15 at the connection part 21 side, and section line XIVD-XIVD' and section line XIVE-XIVE' indicate positions of branch cores 14 and 15 away from connection part 21.

Guided light that is incident from an end of main core 13 that differs from the end at the connection part 21 side propagates through main core 13 and is distributed among branch cores 14 and 15 at connection part 21. By tandem connection of such Y branch circuits in a tree-like manner in N stages (where N is a positive integer), a 2N-branch circuit can be arranged.

The characteristics of a Y branch circuit are evaluated by excess loss L (dB) and branching ratio R (%). If the optical power of light propagating through main core 13 is P0, and the optical powers of light propagating through branch cores 14 and 15 are P1 and P2, respectively, the excess loss L (dB) and the branching ratio R (%) are respectively defined as follows:

$$L(\text{dB}) = -10 \times \log_{10}\left(\frac{P1 + P2}{P0}\right) \quad (1)$$

$$R(\%) = \frac{P1}{P1 + P2} \times 100, \quad (2)$$

or $$R(\%) = \frac{P2}{P1 + P2} \times 100$$

In principle, R=50% can be realized by making the shape of the circuit axisymmetrical with respect to a central axis of main core 13. However, it is known that when branch core 14 or 15 deforms, the branching ratio deviates from 50% or becomes poor in reproducibility (see, for example, Japanese Patent Application Laid-open No. Hei 4-70605 (second column of p. 2 to third column of p. 3, FIGS. 1 and 4; referred to hereinafter as Patent Document 1), Japanese Patent Application Laid-open No. Hei 5-157925 (eleventh paragraph, FIG. 15; referred to hereinafter as Patent Document 2), and Japanese Patent Application Laid-open No. Hei 8-220359 (fifth paragraph, FIG. 5; referred to hereinafter as Patent Document 3)). Thus as shall be described later, gaps 17 and 18 are provided to prevent deformation of branch cores 14 and 15 (see, for example, Patent Document 1).

Branching of the guided light shall now be described in detail. The guided light that propagates through main core 13 propagates into branch cores 14 and 15 at connection part 21. Because branch cores 14 and 15 approach each other at connection part 21 (section line XIVC-XIVC'), the respective guided lights are coupled strongly. Guided lights of this coupled state are separated gradually into the respective branch cores while propagating through branch cores 14 and 15.

Preferably at connection part 21, the field distribution of the guided lights in the coupled state that propagate through branch cores 14 and 15 and the field distribution of the waveguided light at main core 13 are matched as much as possible. This is because mismatch of the two field distributions becomes the excess loss of the Y branch circuit. That is, ideally, gaps 17 and 18 are not provided. However as disclosed in Patent Document 1, it is generally preferable to provide gaps 17 and 18 to prevent fusion of branch cores 14 and 15 and forming of air gaps between cores 14 and 15.

A general method for manufacturing the Y branch circuit shall now be described with reference to FIGS. 15A to 15D. FIGS. 15A to 15D show end sections at the connection part 21 side of branch cores 14 and 15, and FIG. 15D corresponds to FIG. 14C.

First, as shown in FIG. 15A, core layer 12 is formed from a silica-based glass on a silica glass substrate that is to become under clad 10. It is known that this silica-based glass layer can be formed by the FHD (Flame Hydrolysis Deposition) method (see, for example, Japanese Patent Application Laid-open No. Sho 58-105111 (referred to hereinafter as Patent Document 4)). That is, by combusting a raw material gas having SiCl4 as a main component in an oxyhydrogen atmosphere, microparticles of silica-based glass are made to deposit onto under clad 10. By treating (sintering) the microparticles at a high temperature no less than the softening temperature of the microparticles, a transparent silica-based glass layer is obtained. The softening temperature and the refractive index of the silica-based glass are adjusted by mixing a gas of a chloride of germanium (Ge), boron (B), phosphorus (P), etc., in the raw material gas. Ge and P increase the refractive index, and B decreases the refractive index. All of Ge, B, and P lower the softening temperature of the silica-based glass.

To provide a waveguide structure, the refractive index of core layer 12 is set to be 0.2 to 5% higher than the refractive index of under clad 10. This value is called the relative refractive index difference and is calculated as follows:

Relative refractive index difference (%)=(Refractive index of core layer−Refractive index of under clad)÷Refractive index of core layer×100

The softening temperature of the silica-based glass of core layer 12 is set lower than the softening temperature of the silica glass of under clad 10 so that under clad 10 does not become deformed in the treating (heating) step for forming the glass.

Then etching masks 31, onto which circuit shapes have been transferred by a photolithography process, are formed on core layer 12 as shown in FIG. 15B. There is a limit to the resolution of etching masks 31, and it is generally difficult to form a fine pattern of no more than 1 µm with good reproducibility.

Thereafter, using etching masks 31 as protective layers, core layer 12 is removed by etching at parts besides the circuit core to thereby form core ridges 34 and 35 as shown in FIG. 15C. In this process, each core ridge is etched in lateral directions (horizontal directions with respect to the deposition surface of under clad 10) and the width thereof thus becomes approximately 1.5 µm narrower than the width of etching mask 31 (side etching). An interval D2 between two core ridges 34 and 35 is thereby made approximately 1.5 µm wider than an interval D1 of two etching masks 31.

Lastly, as shown in FIG. 15D, over clad 11 is formed from silica-based glass in the same manner as in the case of core layer 12. The refractive index of over clad 11 is set lower than that of core layer 12 and, if possible, is preferably made equal to the refractive index of under clad 10. Also to prevent deformation of core layer 12 (core ridges 34 and 35) in the heating treatment during glass formation, the softening temperature of over clad 11 is set lower then the softening temperature of the silica-based glass of core layer 12. A branch core interval D is substantially equal to the interval D2 between the two core ridges 34 and 35.

As mentioned above, to perform manufacture with good reproducibility, gap 17 is provided at connection part 21. However, a part of the guided light is dissipated at this part, giving rise to excess loss of the Y branch circuit. FIG. 16 shows simulation results of a relationship between the branch core interval D, which is the width of gap 17, and the excess loss of a Y branch circuit. The loss increases quadratically as the branch core interval D widens. With a normal manufacturing method, due to the resolution limit of the etching mask, the etching mask interval D1 must be made no less than 1 µm to form gap 17 with good reproducibility, and due to side etching during core processing, the gap between core ridges increases further by another 1.5 µm. That is, with the conventional technique, the branch core interval D is no less than 2.5 µm, and thus the excess loss of the Y branch circuit was 0.2 dB. For example, when five such Y branch circuits are connected in tandem to prepare a 32-branch circuit, the excess loss becomes 1 dB. Because the loss of an optical fiber is 0.2 dB per 1 km, an excess loss of 1 dB corresponds to decreasing the service range of FTTH by 5 km. The loss of a branch circuit is thus required to be lessened even by 0.1 dB.

SUMMARY OF THE INVENTION

An object of the present invention is to provide a Y branch circuit of low excess loss and good reproducibility. Another object of the present invention is to provide a method for manufacturing a Y branch circuit of low excess loss and good reproducibility.

A Y branch circuit of the present invention includes: a under clad; a circuit core, formed on the under clad and in turn including a main core and two branch cores connected to the main core; and an over clad that embeds the circuit core; wherein the core and the two branch cores are connected across an interval, and the two branch cores have a width-to-height ratio of 50% to 150% and have, at an end part at the main core side, a gap that is narrower at the over clad side than at the under clad side.

The gap of the two branch cores is preferably no more than 1.5 µm at the over clad side.

Furthermore, the interval between the main core and the two branch cores is preferably no less than 2.5 µm.

Also preferably, the over clad is formed of silica glass or silica-based glass with a softening temperature that is 100° C. to 250° C. lower than the softening temperature of the core layer.

Furthermore, the over clad is preferably treated at a temperature that is 50° C. to 200° C. higher than the softening temperature of the core layer.

A method for manufacturing Y branch circuit of the present invention includes the steps of: forming a core layer of higher refractive index than a under clad on the under clad; removing a part of the core layer to form a circuit core, arranged from a single main core and two branch cores that are connected to the main core across an interval and have a gap in between each other; and covering the circuit core with an over clad of lower refractive index than the circuit core and making the gap between the two branch cores narrower at the over clad side than at the under clad side.

Preferably, the step of forming the circuit core includes the steps of: making the interval between the main core and the two branch cores no less than 2.5 µm; and making the width-to-height ratio of the two branch cores 50% to 150%.

Also preferably, in the step of covering the circuit core, the over clad that covers the circuit core is formed of silica glass or silica-based glass with a softening temperature that is 100° C. to 250° C. lower than the softening temperature of the core layer, and the step of covering the circuit core further includes a step of: treating the over clad at a temperature 50° C. to 200° C. higher than the softening temperature of the core layer.

Furthermore preferably, the step of covering the circuit core is a step of making the gap at the over clad side no more than 1.5 µm.

By connecting the main core and the two branch cores at a connection part having an interval, the branch cores can be deformed in a stable manner near the connection part. Also, an interval that is narrower than the interval, limited by the resolution limit of an etching mask or by side etching during core processing, is formed and excess loss of the Y branch circuit can thus be made low. Furthermore, by setting the relationships among the softening temperatures and treating temperatures of the under clad, circuit core, and over clad and setting the width-to-height ratio of the branch cores, the branch cores can be deformed appropriately with good reproducibility. A Y branch circuit of low loss and good reproducibility can thus be provided.

Thus with the Y branch circuit according to the present invention, by making the gap between the branch cores narrower at the over clad side than at the under clad side at the core ridges at which the branch cores were separated by an interval of no less than 2.5 µm, low-loss characteristics of no more than 0.1 dB can be realized.

Also by separating the main core and the branch cores by a gap and enabling the branch cores to deform in a stable manner, by using silica-based glass as the materials for forming the core layer and the over clad so that the softening temperature of the over clad is lower than the softening temperature of the core layer by 100 to 250° C., and by making the width-to-height ratio of the branch cores 50% to 150%, a Y branch structure, with which the interval between branch cores is narrower at the over clad side than at the under clad side, can be realized with good reproducibility.

Furthermore, by treating the over clad at a temperature higher than the softening temperature of the core layer by 50° C. to 200° C., a Y branch circuit, with which the branch cores are deformed appropriately, can be manufactured.

The above and other objects, effects, features, and advantages of the present invention will become more apparent from the following description of the embodiments thereof taken in conjunction with the accompanying drawings.

BRIEF DESCRIPTION OF THE DRAWINGS

FIG. 6 is a diagram of results of evaluating relationships among a softening temperature of a core layer, a softening temperature of an over clad, a temperature of treating the over clad at high temperature and the state of the core and the excess loss of Y branch circuits in relation to the Y branch circuit and method for manufacturing the same according to the present invention;

FIG. 7 is a diagram of results of evaluating relationships among the softening temperature of the core layer, the softening temperature of the over clad, a temperature of treating the over clad at high temperature and the state of the core and the excess loss of Y branch circuits in relation to the Y branch circuit and method for manufacturing the same according to the present invention;

FIG. 8 is a diagram of results of evaluating relationships among the softening temperature of the core layer, the softening temperature of the over clad, a temperature of treating the over clad at high temperature and the state of the core and the excess loss of Y branch circuits in relation to the Y branch circuit and method for manufacturing the same according to the present invention;

FIG. 9 is a diagram of results of evaluating relationships among the softening temperature of the core layer, the softening temperature of the over clad, a temperature of treating the over clad at high temperature and the state of the core and the excess loss of Y branch circuits in relation to the Y branch circuit and method for manufacturing the same according to the present invention;

FIG. 10 is a diagram of results of evaluating relationships among the softening temperature of the core layer, the softening temperature of the over clad, a temperature of treating the over clad at high temperature and the state of the core and the excess loss of Y branch circuits in relation to the Y branch circuit and method for manufacturing the same according to the present invention;

FIG. 11 is a diagram of results of evaluating relationships among the softening temperature of the core layer, the softening temperature of the over clad, a temperature of treating the over clad at high temperature and the state of the core and the excess loss of Y branch circuits in relation to the Y branch circuit and method for manufacturing the same according to the present invention;

FIG. 12 is a diagram of results of evaluating relationships among the softening temperature of the core layer, the softening temperature of the over clad, a temperature of treating the over clad at high temperature and the state of the core and the excess loss of Y branch circuits in relation to the Y branch circuit and method for manufacturing the same according to the present invention;

DETAILED DESCRIPTION OF THE PREFERRED EMBODIMENTS

Embodiments of a Y branch circuit and a method for manufacturing the same according to the present invention shall now be described with reference to the drawings.

Figure 1A:
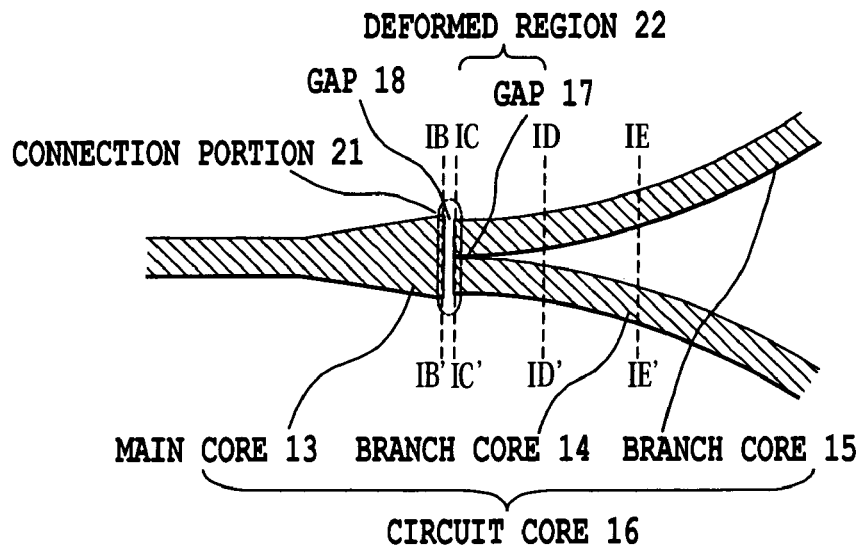
FIGS. 1A to 1E are diagrams for describing an embodiment of a Y branch circuit according to the present invention.
Figure 1B:
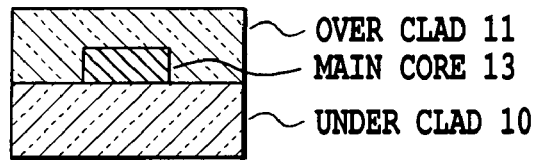
Figure 1C:
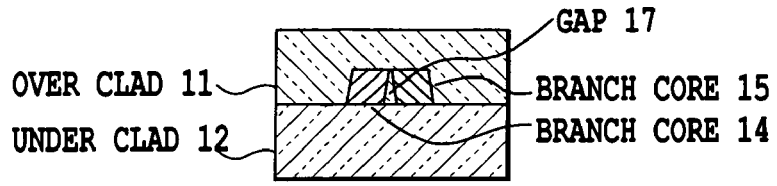
Figure 1D:
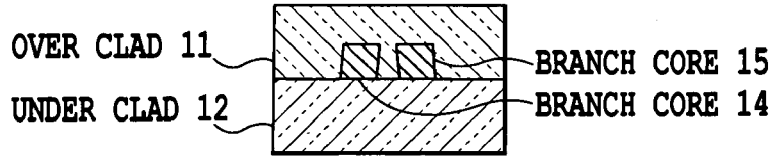
Figure 1E:
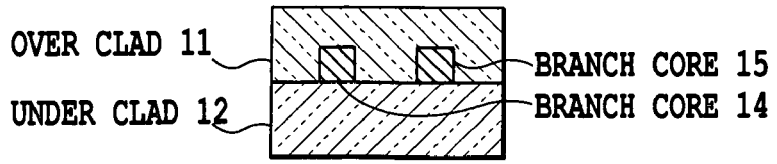

FIGS. 1A to 1E show an embodiment of a Y branch circuit according to the present invention. FIG. 1A is a plan view and FIGS. 1B to 1E are sections taken on section lines IB-IB', IC-IC', ID-ID', and IE-IE', respectively, of FIG. 1A.

The Y branch circuit shown in FIGS. 1A to 1E includes: a under clad 10; a circuit core 16, formed on under clad 10 and composed of a main core 13 and two branch cores 14 and 15 connected to main core 13; and an over clad 11 that embeds circuit core 16. Main core 13 and branch cores 14 and 15 are connected across a gap 18 at a connection part 21. Branch cores 14 and 15 have a gap 17 between each other at an end part at the connection part 21 side (section line IC-IC') (see FIG. 1C). Also, branch cores 14 and 15 gradually separate from each other as the distance from connection part 21 increases (see FIGS. 1D and 1E). The width of main core 13 at the connection part 21 end (section line IB-IB') enlarges to approximately the total width of branch cores 14 and 15 at the connection part 21 end (section line IC-IC').

Circuit core 16 is disposed on under clad 10 and is covered by over clad 11. A silica glass substrate is used as under clad 10. So that light can propagate, circuit core 16 is formed of a silica-based glass of higher refractive index than under clad 10. Over clad 11 is formed of a silica-based glass of lower refractive index than circuit core 16. Preferably, over clad 11 and under clad 10 are made equal in refractive index.

At the connection part 21 end of branch cores 14 and 15, gap 17 is formed to be narrower at the over clad 11 side than at the under clad 10 side. This is realized by forming a deformed region 22 at which branch cores 14 and 15 deform and tilt so as to lean toward each other near connection part 21. A method for manufacturing such branch cores shall be described later by way of an embodiment of a Y branch circuit manufacturing method.

Figure 2:
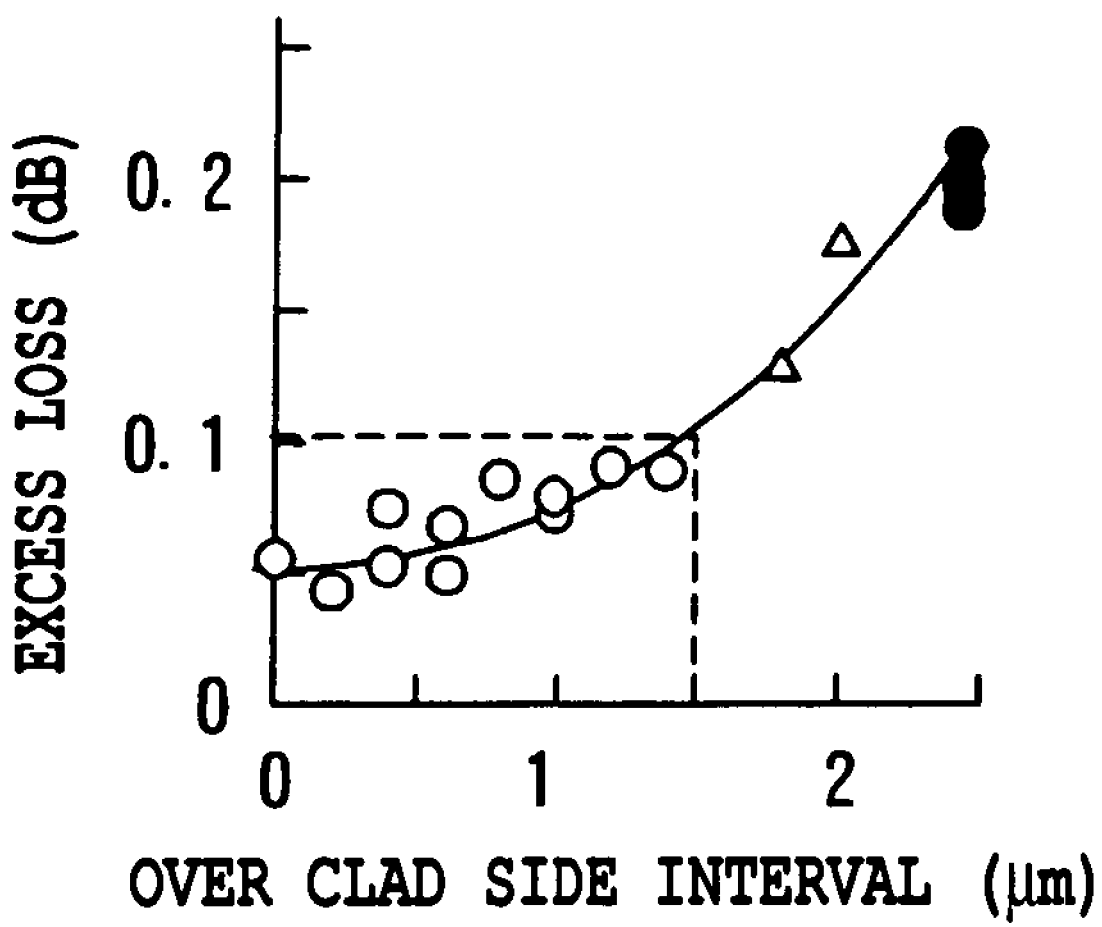
FIG. 2 is a diagram for describing a relationship between an over clad side interval between branch cores of the Y branch circuit and excess loss.

FIG. 2 shows a relationship between the over clad side interval of gap 17 at the connection part 21 end of branch cores 14 and 15 and excess loss of the Y branch circuit. The results for cases where branch cores 14 and 15 are 6, 8, 10 µm in width are shown. The height of branch cores 14 and 15 is 8 µm. At the connection part 21 end of branch cores 14 and 15, gap 17 is 2.5 µm at the under clad 10 side. The white circles, white triangles, and black circles in the figure, respectively, correspond to width-to-height ratios in FIG. 4 to be described later, of 75%, 100%, and 125%, respectively. When the over clad side interval of gap 17 at the connection part 21 end of branch cores 14 and 15 is 0 µm, branch cores 14 and 15 contact each other at the over clad 11 side. Whereas the branching loss in the case where there is no tilting is 0.2 dB, by deforming so that the over clad side interval of gap 17 of branch cores 14 and 15 becomes 1.5 µm or less, the branching loss is made no more than 0.1 dB. Though with the Y branch circuit of the conventional technique, gap 17 of 2.5 µm or less is difficult to prepare due to resolution of photoresist and side etching of core ridges, by tilting of branch cores 14 and 15, the over clad 11 side interval of gap 17 at the connection part 21 end of branch cores 14 and 15 can be made 1.5 µm or less to achieve low loss in the Y branch circuit.

An embodiment of a Y branch circuit manufacturing method according to the present invention shall now be described with reference to FIGS. 3A to 3E. FIGS. 3A to D show sections of the connection part 21 end of branch cores 14 and 15, with FIG. 3D corresponding to FIG. 1C. In FIG. 3E, branch core 14 of FIG. 3D is enlarged and indicated by solid lines, and a state of branch core 14 (core ridge 35) before deformation in a deformed region is indicated by broken lines.

Figure 3A:
FIGS. 3A to 3E are diagrams for describing an embodiment of a Y branch circuit manufacturing method according to the present invention.
Figure 3B:
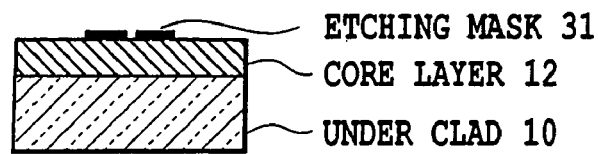
Figure 3C:
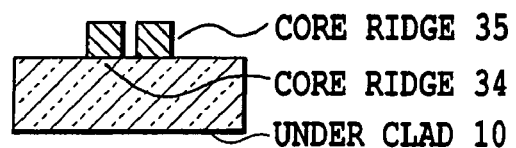
Figure 3D:
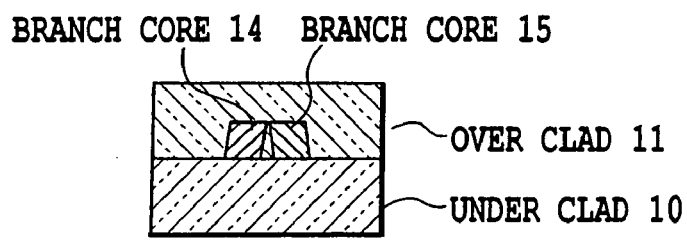
Figure 3E:
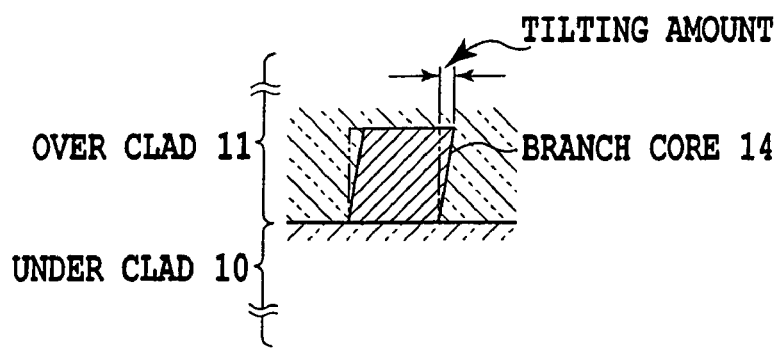

In outline, the process is the same as that of the conventional technique (FIGS. 15A to 15D) That is, core layer 12 is formed from silica-based glass on a silica glass substrate that is to become under clad 10 (FIG. 3A). Then by a photolithography process, the shape of the Y branch circuit is transferred onto etching masks 31 (FIG. 3B), and using these etching masks 31 as protective layers, core ridges 34 and 35 are formed (FIG. 3C) Lastly, over clad 11 is formed from silica-based glass so as to cover core ridge 22 (FIG. 3D).

The inventors discovered that by tilting branch cores 14 and 15 and thereby forming deformed region 22 near connection part 21 in the process of forming over clad 11, a Y branch circuit of low excess loss can be manufactured. Upon examining shapes and manufacturing methods of Y branch circuits, appropriate conditions were found. These conditions are summarized as follows:

[1] The main core and the branch cores are separated by a gap of no less than 2.5 µm.
[2] The width of each branch core is within 50% to 150% of the height.
[3] The softening temperature of the over clad is lower the softening temperature of the core layer, and the difference is 100° C. to 250° C.
[4] The over clad is formed by treating at a temperature that is 50° C. to 200° C. higher than the softening temperature of the core layer.

The same technique as condition [1] given above is disclosed in Patent Document 1. In Patent Document 1, it is described that by providing a gap 18 between a main core 13 and branch cores 14 and 15, an adequate amount of glass is supplied into a gap 17 between the branch cores and the tilting of branch cores 14 and 15 is thereby prevented. Oppositely in the present invention, condition [1] above is a necessary condition for tilting the branch cores in a stable manner. This is because if main core 13 and branch cores 14 and 15 are connected without any gaps, main core 13 restrains the tilting of branch cores 14 and 15. The present invention and Patent Document 1 thus differ completely in the object and effect of providing gap 18.

Conditions [2] to [4] given above relate to the tilting of the branch cores. Conventionally, and not just in Y branch circuits, the tilting of adjacent cores was recognized as an issue to be resolved. In the above mentioned Patent Document 1, it is described that the tilting of adjacent cores occurs as a result of inadequate supplying of silica-based glass microparticles that are to become the over clad. In Patent Document 2, it is indicated that a reason why adjacent cores tilts is that the difference of the transparent glass formation temperatures of the over clad and the cores is only approximately 200° C. at the most. In Patent Document 3, it is reported that in forming the over clad glass using the flame hydrolysis deposition method, the tilting of adjacent cores occurs due to shrinkage of the glass microparticles during clearing of the glass. In all of these Patent Documents, the tilting of adjacent cores is deemed to be an issue to be resolved and methods for resolving this issue are described.

The present inventors found that the tilting of adjacent cores, which was conventionally an issue to be resolved, is effective for realizing low loss in a Y branch circuit. The inventors found that when the circuit core that makes up the Y branch circuit satisfies the above condition [1] and when the above conditions [2] to [4] are met as well, the branching ratio of the Y branch circuit can be made 50% with good reproducibility and the branching loss can be made smaller than in conventional arrangements.

The process by which the above conditions [2] to [4] were found shall now be summarized.

As factors that affect the deformation of the branch cores, the inventors noted the width-to-height ratio A(%) (=width÷height×100) of the branch cores and the difference ΔTs (=core layer softening temperature Tsc−over clad softening temperature Tso) of the glass softening temperatures of the over clad and the core layer, and examined these factors and the manner of deformation.

Y branch circuits that were examined were prepared as follows. First, on a silica substrate with a softening temperature of 1700° C. that is under clad 10, silica-based glass microparticles with a softening temperature of 1050° C. were deposited by flame hydrolysis deposition, and these microparticles were made transparent at 1350° C. to form core layer 12 of 8 µm thickness. The refractive index of core layer 12 was adjusted to be 0.3% higher than that of under clad 10 (relative refractive index difference=0.3%). By then performing a photolithography process and an etching process, core ridges of Y branch circuit shapes, each having two branch core ridges 34 and 35 with a 2.5 µm interval at connection part 21, were formed. Here, core ridges of 2, 4, 6, 8, 10, 12, 14, and 16 µm width were formed on the same substrate. Seven substrates with circuit core ridges were prepared by this method. On the respective core ridges, silica-based glass microparticles of softening temperatures of 650, 750, 800, 850, 900, 950, and 1000° C., respectively, were deposited by flame hydrolysis deposition. Over clads 11 were then formed by treating (clearing) at temperatures 300° C. higher than the softening temperatures of the respective silica-based glass microparticles. Over clads 11 were adjusted to be equal in refractive index to under clad 10.

Figure 4:
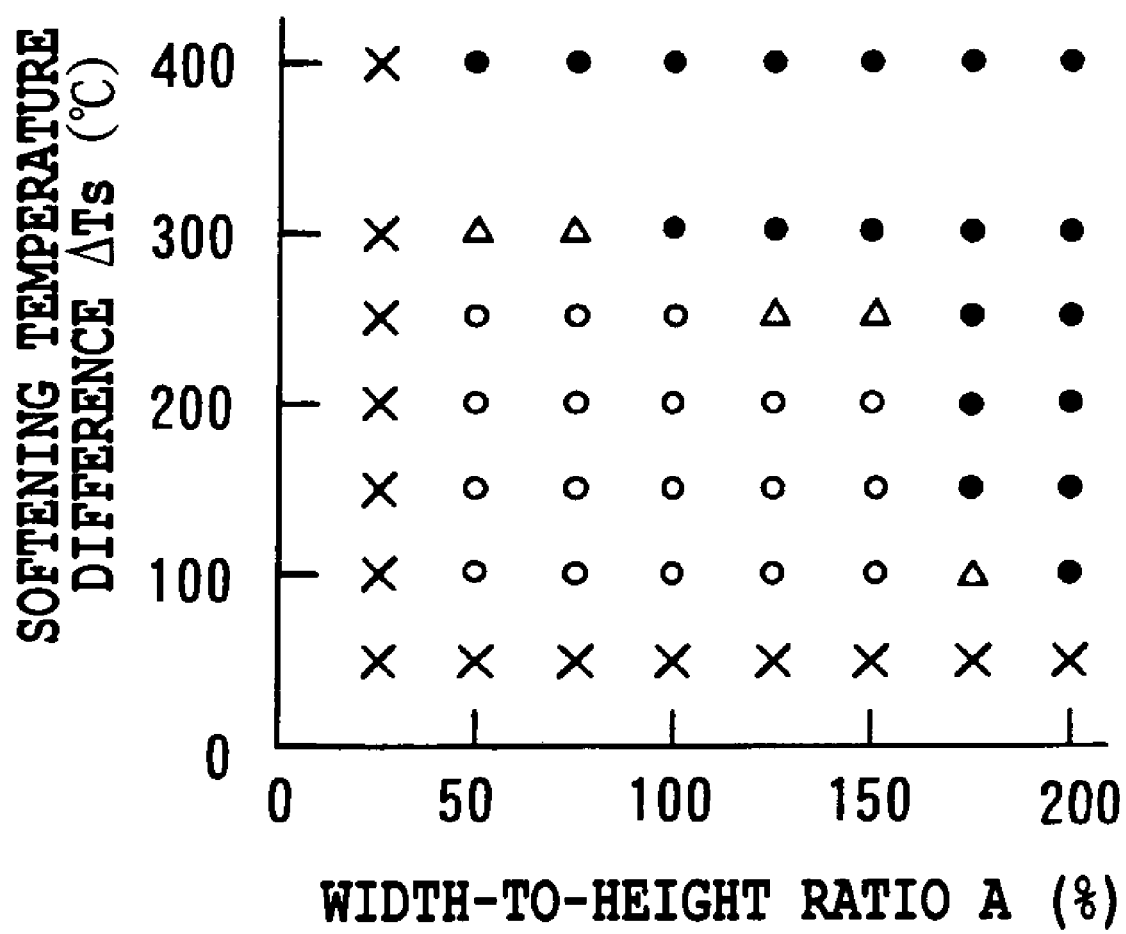
FIG. 4 is a diagram of results of evaluating a tilting amount of the branch cores in relation to the Y branch circuit and method for manufacturing the same according to the present invention.

The results of evaluating the tilting amounts of branch cores 14 and 15 at the front end part are shown in FIG. 4. The abscissa indicates the width-to-height ratio A of the branch cores, and the ordinate indicates the softening temperature difference ΔTs between core layer 12 and over clad 11. The white circles, white triangles, black circles, and x's express different tilting amounts of branch cores 14 and 15. The white circles indicate tilting amounts of no less than 0.5 μm, the white triangles indicate tilting amounts of less than 0.5 μm, and the black circles indicate that tilting did not occur. The x's indicate results in which the core deformed inappropriately. In FIG. 3C, the case where the interval between core ridges 34 and 35 is 2.5 μm and the tilting amount is 0.5 μm corresponds to the case where the over clad side interval in FIG. 2 is 1.5 μm.

In general, the smaller the width-to-height ratio A of the branch cores, or the smaller the softening temperature difference ΔTs, the greater the tilting amount. However, with A<50%, the branch cores 14 and 15 deformed asymmetrically or became tilted even at positions far from connection part 21. Also with ΔTs=50° C., branch cores 14 and 15 deformed in a rounding manner. These states (indicated by the x's in FIG. 4) were inappropriate in terms of the Y branch circuit because the branching ratio deviated from 50% or excessive excess loss occurred. Meanwhile, with Y branch circuits for which A≧175% or ΔT≧300° C., significant tilting of branch cores 14 and 15 were not seen (black circles in FIG. 4). Under the conditions indicated by the white circles and the white triangles, branch cores 14 and 15 were tilted in deformed region 22, were not tilted at other parts, and could be applied as branch cores of a Y branch circuit.

When, as shown in FIG. 2, the branch cores approach each other at the over clad side, the excess loss decreases. The range indicated by the white circles of FIG. 4 thus indicates an appropriate region for branch cores of a low-loss Y branch. That is, this region is one in which the width-to-height ratio A of the branch cores is 50% to 150% (condition [2]) and the softening temperature difference ΔTs is in the range of 100° C. to 250° C. (condition [3]).

Figure 5:
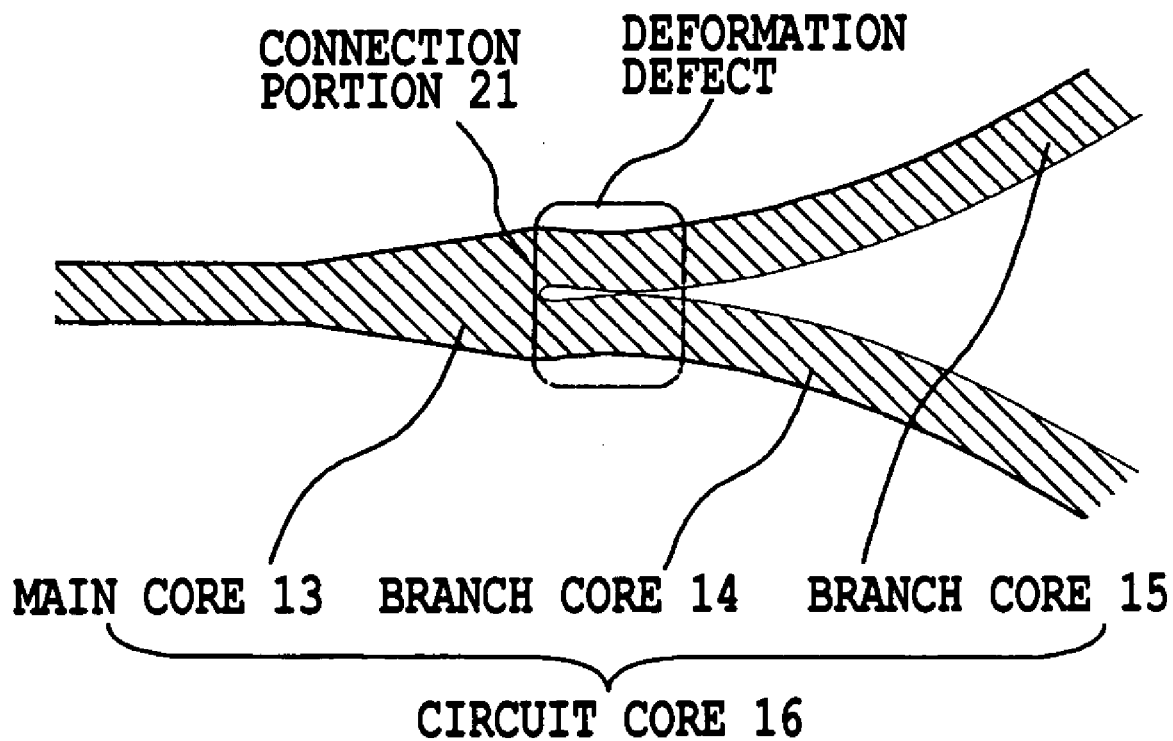
FIG. 5 is a plan view of a Y branch circuit that does not have a gap provided at a connection part.

As an example that does not meet the above condition [1], a plan view of a Y branch circuit that was prepared without providing gap 18 is shown in FIG. 5.

Here, a circuit core 16 was formed using a silica-based glass with a softening temperature of 1050° C. and a relative refractive index of 0.3% on a silica substrate. The softening temperature of over clad 11 was 900° C. The height and width of branch cores 14 and 15 were both 8 μm.

In this example, because gap 18 is not provided, two problems arose. Firstly, branch cores 14 and 15 could not deform freely near connection part 21 and gap 17 could not be formed to become narrow gradually. Secondly, due to inadequate supplying of the silica-based glass microparticles, branch cores 14 and 15 deformed suddenly at a region away from connection part 21. Due to these defectively deformed regions, the branching ratio deviated from 50% and the loss was also large.

The inventors furthermore carried out examination in the same manner on cases of a core layer of 6 μm thickness and 0.7% relative refractive index difference and a core of 7 μm thickness and 0.4% relative refractive index difference. It was thus found that when the width-to-height ratio A of the branch core is in the range of 50% to 150% and the softening temperature difference ΔTs is in the range of 100° C. to 250° C., branch cores 14 and 15 tilt appropriately and the excess loss of the Y branch circuit can be reduced.

The inventors furthermore carried out an examination concerning the softening temperature Tsc of core layer 12, the softening temperature Tso of over clad 11, and the temperature Tto of treating (clearing) at high temperature, and evaluated the states of the core and the excess loss of the Y branch circuit. The respective temperatures and the evaluation results are shown in FIGS. 6 to 12. ΔTs indicates the difference (Tsc−Tso) between the softening temperature of core layer 12 and the softening temperature of over clad 11. FIG. 6 corresponds to the results of FIG. 4.

Here, the white circles indicate that branch cores 14 and 15 deformed appropriately, gap 17 became no more than 1.5 μm at the over clad 11 side, and the excess loss of the Y branch circuit was no more than 0.1 dB. The black circles indicate cases where deformation did not occur or occurred inadequately and the excess loss was higher than 0.1 dB. The x's indicate results in which the core deformed inappropriately. The black squares indicate that clearing of over clad 11 was incomplete and a satisfactory waveguide was not obtained.

The results shown in FIGS. 6 to 12 indicate that there is an appropriate relationship among the softening temperature Tsc of core layer 12, the softening temperature Tso of over clad 11, and the clearing temperature Tto of the over clad.

Among these, the results of FIG. 8 in particular indicate that when the softening temperature Tsc of the core is no less than 300° C. higher than the softening temperature Tso of the over clad, satisfactory deformation of the branch cores cannot be obtained regardless of the softening temperature of the over clad. Clearly, when Tto is less than Tsc, the core does not soften and become deformed. Meanwhile, when Tto is higher than Tsc, though the core softens, at the clearing temperature, the viscosity of the over clad drops considerably so that it can enter readily into the gap between the branch cores and cannot deform the branch cores. When Tto is even higher (Tto=1300° C.), the branch cores deform so as to become rounded in themselves.

Figure 13:
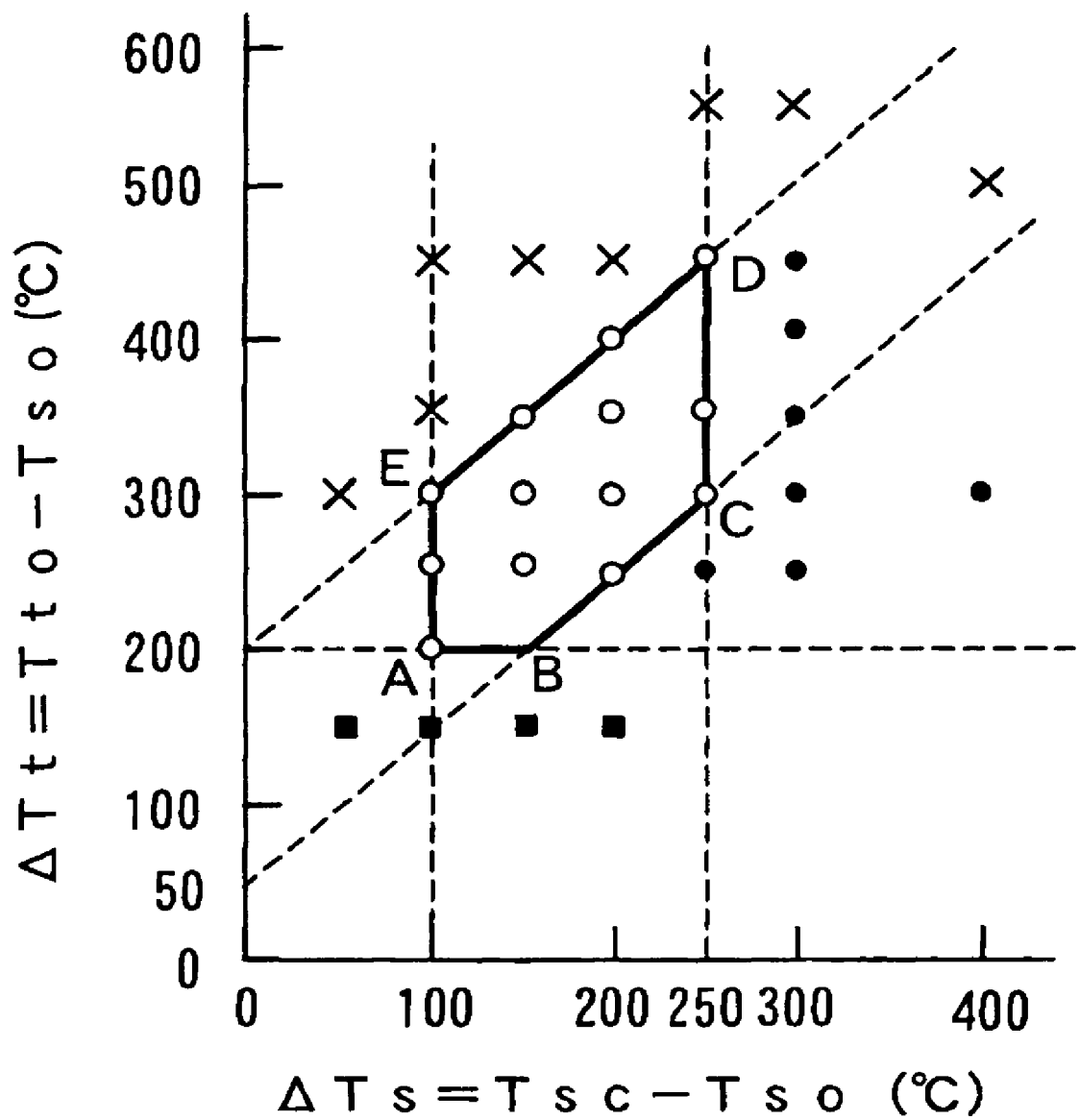
FIG. 13 is a diagram of relationships between the softening temperature of the core layer, the softening temperature and the clearing temperature of the over clad, and evaluation results of Y branch circuits in relation to the Y branch circuit and method for manufacturing the same according to the present invention.
Figure 14A:
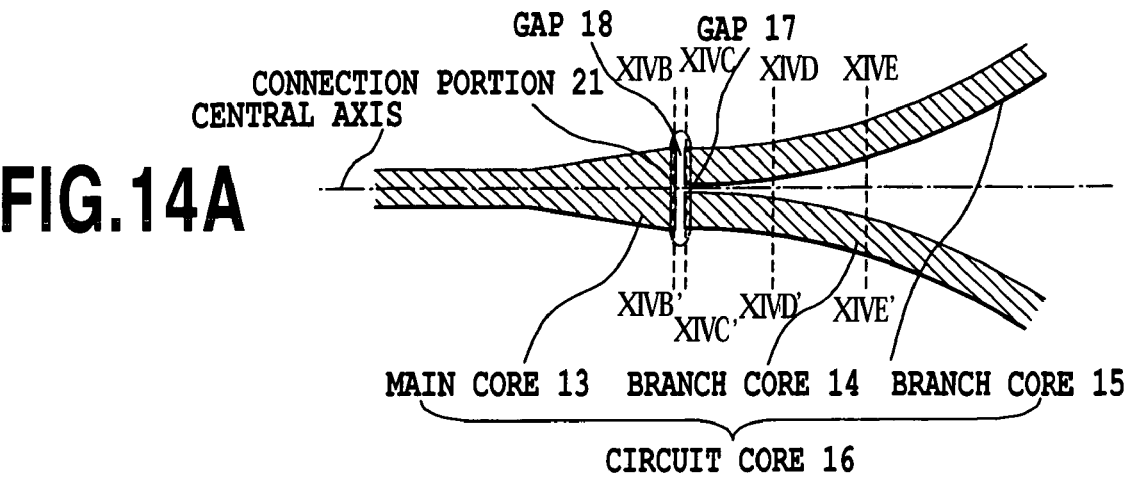
FIGS. 14A to 14E are diagrams for describing a conventional Y branch circuit.
Figure 14B:
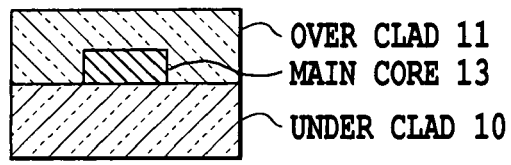
Figure 14C:
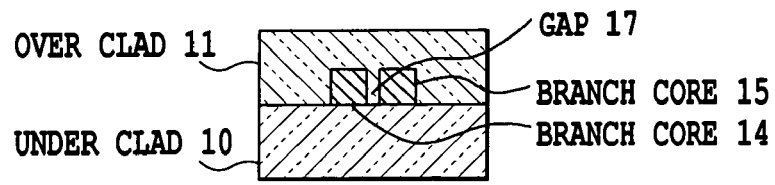
Figure 14D:
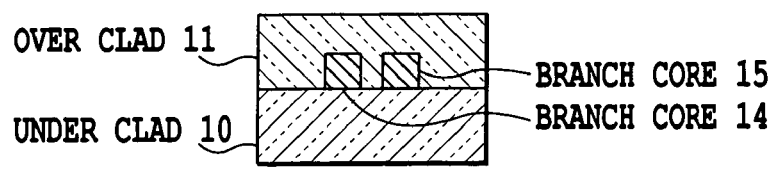
Figure 14E:
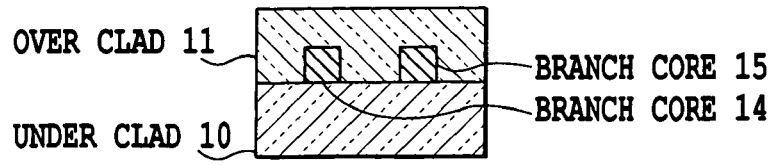
Figure 15A:
FIGS. 15A to 15D are diagrams for describing a conventional Y branch circuit manufacturing method.
Figure 15B:
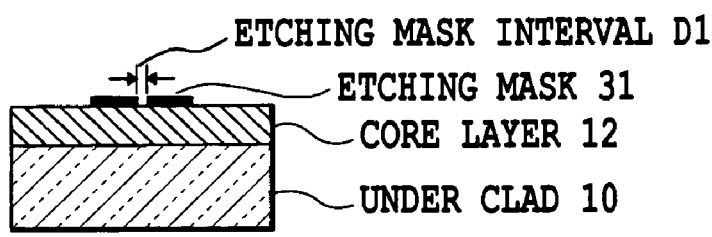
Figure 15C:
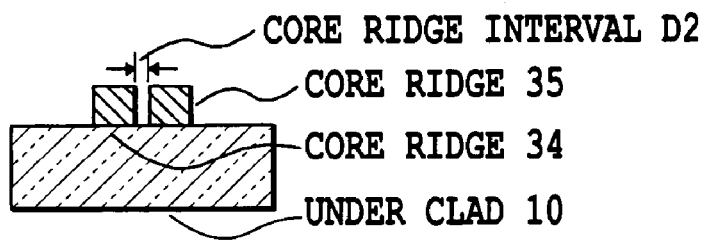
Figure 15D:
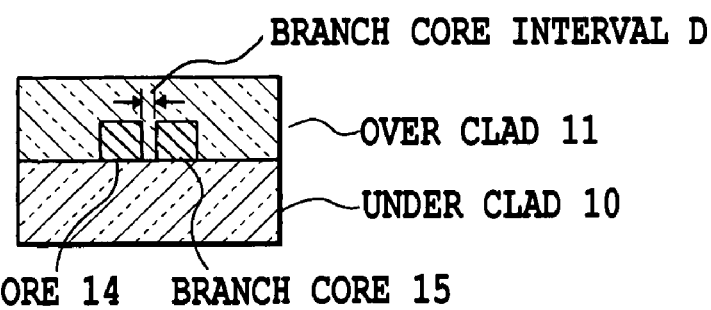
Figure 16:
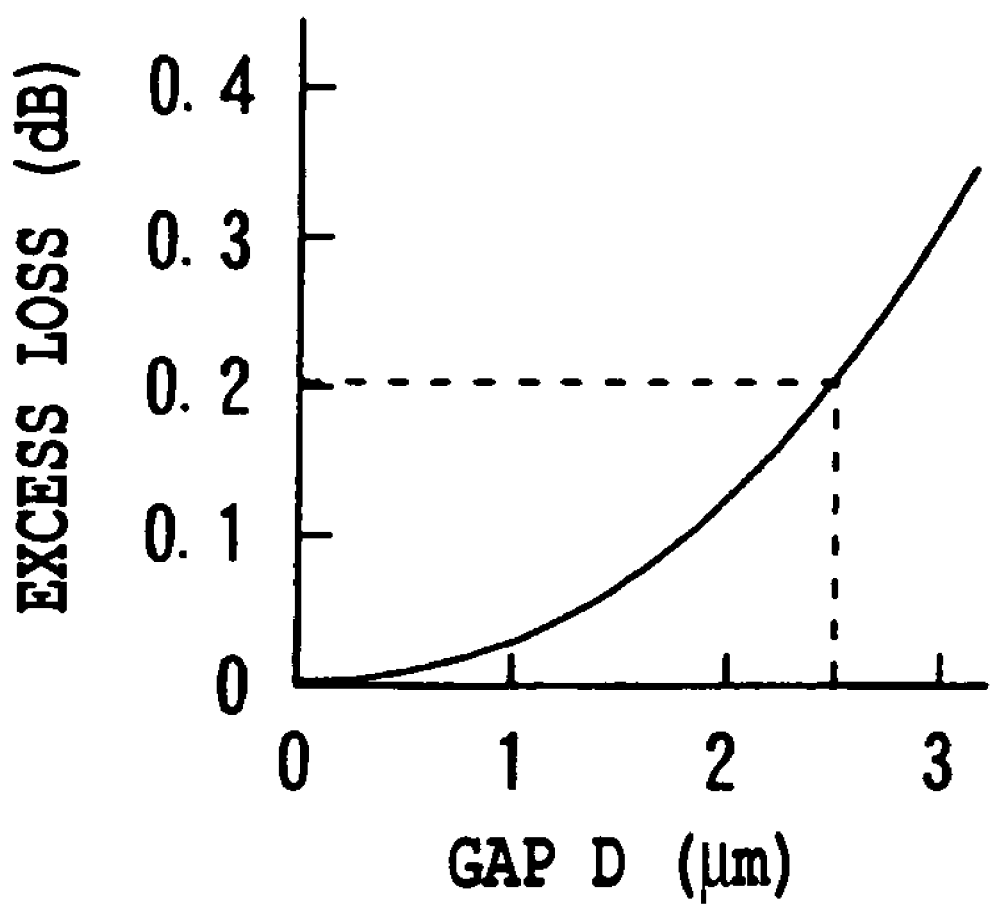
FIG. 16 is a diagram for describing a relationship between a gap between branch cores at a front end part and the excess loss of a Y branch circuit.

FIG. 13 shows the evaluation results, based on the results of FIGS. 6 to 12 and using the softening temperature difference ΔTs (=Tsc−Tso) of the core layer and the over clad and the difference ΔTt(=Tto−Tso), between the temperature of treating (clearing) the over clad at high temperature and the softening temperature of the over clad, as parameters. This figure shows that a satisfactory Y branch circuit can be realized within a pentagonal region surrounded by the five points, A, B, C, D, and E in the figure. In terms of mathematical formulae, this region can be expressed as satisfying the following formulae simultaneously:

$$100° C. \leq \Delta Ts \leq 250° C. \quad \text{Formula (1)}$$

$$\Delta Ts + 50° C. \leq \Delta Tt \leq \Delta Ts + 200° C. \quad \text{Formula (2)}$$

$$\Delta Tt \geq 200° C. \quad \text{Formula (3)}$$

Formula (1) is equivalent to:

$$Tsc - 250° C. \leq Tso \leq Tsc - 100° C. \quad \text{Formula (1')}$$

and corresponds to the above condition [3]. Also, Formula (2) is equivalent to:

$$Tsc + 50° C. \leq Tto \leq Tsc + 200° C. \quad \text{Formula (2')}$$

and corresponds to the above condition [4]. Formula (3) indicates that the clearing temperature of the over clad must be made no less than 200° C. higher than its softening temperature.

Also, though in the above-described examination a silica plate with a softening temperature of 1700° C. was used in under clad 10, the material and the softening temperature of the under clad are not limited thereto. As with a general method for manufacturing a waveguide type optical circuit using a silica-based glass formed by flame hydrolysis deposition, the Y branch circuit according to the present invention can be prepared as long as the softening temperature of the under clad is higher than the clearing temperature of the core layer.

The method for manufacturing the silica-based glass in the Y branch circuit and in the manufacturing method for the same according to the present invention is not restricted to the flame hydrolysis deposition method, and as long as the relationships of the softening temperatures and the high-temperature heat treatment temperature satisfy the temperature relationships of the present invention, another manufacturing method, such as the CVD (Chemical Vapor Deposition) method, sputtering method, vapor deposition method, sol-gel method, etc., may be employed.

The Y branch circuit and the manufacturing method for the same according to the present invention are not restricted solely to a single Y branch circuit, and can be applied to all waveguide circuits that contain a Y branch circuit, such as an optical branching circuit in which Y branch circuits are subordinately connected in multiple stages, a Mach-Zehnder interferometer arranged by respectively connecting two branch cores of a Y branch circuit to two branch cores of another Y branch circuit, etc.

The present invention has been described in detail with respect to preferred embodiments, and it will be apparent from the foregoing to those skilled in the art that changes and modifications may be made without departing from the invention in its broader aspect, and it is the intention, therefore, in the appended claims to cover all such changes.

What is claimed is:

1. A Y branch circuit comprising:
    an under clad;
    a circuit core formed on the under clad and comprising
        a main core and
        two branch cores each having an end part that is connected to the main core across a first gap, the end parts of the two branch cores being separated from each other by a second gap; and
    an over clad that embeds the circuit core;
    wherein
        the end parts of the two branch cores tilt toward each other such that the second gap is narrower at the over clad side of the two branch cores than at the under clad side thereof, and
        the width of the end part of each branch core at the over clad side is substantially the same as the width of the end part of the branch core at the under clad side.

2. The Y branch circuit according to claim 1, wherein the distance between the two branch cores across the second gap at the over clad side is no more than 1.5 μm.

3. The Y branch circuit according to claim 1, wherein the distance between the main core and the end parts of the two branch cores across the first gap is no less than 2.5 μm.

4. The Y branch circuit according to claim 1, wherein the over clad is formed of silica glass or silica-based glass with a softening temperature that is 100° C. to 250° C. lower than the softening temperature of the core layer.

5. The Y branch circuit according to claim 1, wherein the over clad is treated at a temperature that is 50° C. to 200° C. higher than the softening temperature of the core layer.

6. The Y branch circuit according to claim 1, wherein the two branch cores each have a width-to-height ratio of 50% to 150%.

7. A method for manufacturing a Y branch circuit comprising the steps of:
    forming a core layer of higher refractive index than an under clad on the under clad;
    removing a part of the core layer to form a circuit core, the circuit core comprising a single main core and two branch cores, the two branch cores each having an end part that is connected to the main core across a first gap, the end parts of the two branch cores being separated from each other by a second gap; and
    covering the circuit core with an over clad such that the end parts of the two branch cores tilt toward each other so that the second gap is narrower at the over clad side of the two branch cores than at the under clad side thereof and the width of the end part of each branch core at the over clad side is substantially the same as the width of the end part of the branch core at the under clad side, the over clad having a lower refractive index than the circuit core.

8. The method for manufacturing a Y branch circuit according to claim 7, wherein removing a part of the core layer to form a circuit core comprises:
    making the first gap no less than 2.5 μm; and
    making a width-to-height ratio of the two branch cores 50% to 150%.

9. The method for manufacturing a Y branch circuit according to claim 7, wherein
    the over clad that covers the circuit core is formed of silica glass or silica-based glass with a softening temperature that is 100° C. to 250° C. lower than the softening temperature of the core layer, and
    the method further comprises treating the over clad at a temperature 50° C. to 200° C. higher than the softening temperature of the core layer.

10. The method for manufacturing a Y branch circuit according to claim 7, wherein the distance between the two branch cores across the second gap at the over clad side is no more than 1.5 μm.

* * * * *

UNITED STATES PATENT AND TRADEMARK OFFICE
CERTIFICATE OF CORRECTION

PATENT NO. : 7,499,613 B2
APPLICATION NO. : 11/447229
DATED : March 3, 2009
INVENTOR(S) : Yasuhiro Hida It is certified that error appears in the above-identified patent and that said Letters Patent is hereby corrected as shown below:

On the Title Page

Item (73), Please add; Nippon Telegraph and Telephone Corporation.

Signed and Sealed this

Seventh Day of July, 2009

JOHN DOLL
*Acting Director of the United States Patent and Trademark Office*